(12) United States Patent
Lin et al.

(10) Patent No.: US 11,516,723 B2
(45) Date of Patent: Nov. 29, 2022

(54) ENERGY-BALANCED AND LATENCY-CONSTRAINED ROUTING METHODS IN WIRELESS NETWORK

(71) Applicant: CARRIER CORPORATION, Palm Beach Gardens, FL (US)

(72) Inventors: Chih-Kuang Lin, Clonee (IE); Piyush Agrawal, Cork (IE); Ankit Tiwari, South Windsor, CT (US); Adam Kuenzi, Silverton, OR (US); Michael Lang, Oregon City, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/254,061

(22) PCT Filed: Sep. 26, 2019

(86) PCT No.: PCT/US2019/053077
§ 371 (c)(1),
(2) Date: Dec. 18, 2020

(87) PCT Pub. No.: WO2020/081207
PCT Pub. Date: Apr. 23, 2020

(65) Prior Publication Data
US 2021/0266814 A1    Aug. 26, 2021

Related U.S. Application Data

(60) Provisional application No. 62/747,851, filed on Oct. 19, 2018.

(51) Int. Cl.
*H04W 40/10* (2009.01)
*H04L 43/0805* (2022.01)
(Continued)

(52) U.S. Cl.
CPC ......... *H04W 40/10* (2013.01); *H04L 43/0805* (2013.01); *H04L 43/0858* (2013.01);
(Continued)

(58) Field of Classification Search
None
See application file for complete search history.

(56) References Cited

U.S. PATENT DOCUMENTS 6,973,039 B2   12/2005   Redi et al.
7,161,926 B2   1/2007   Elson et al.
(Continued)

FOREIGN PATENT DOCUMENTS

| CN | 103338493 B | 7/2016 |
| EP | 1962458 A1 | 8/2008 |
| WO | 2011040659 A1 | 4/2011 |

OTHER PUBLICATIONS

International Search Report for International Application No. PCT/US2019/053077, International Filing Date Sep. 26, 2019, dated Nov. 26, 2019, 6 pages.
(Continued)

*Primary Examiner* — Anh Ngoc M Nguyen
(74) *Attorney, Agent, or Firm* — Cantor Colburn LLP

(57) ABSTRACT

A method of operating an access control system comprising a plurality of access controls, the method comprising: determining an energy metric of each of the plurality of access controls; determining a latency metric of each of the plurality of access controls; transmitting the energy metric of each of the plurality of access controls; transmitting the latency metric of each of the plurality of access controls; collecting the energy metric and the latency metric at a head node or collecting energy metric at each of the plurality of access controls from a 1-hop transmission distance; and determining a data route through the plurality of access
(Continued)

controls in response to the energy metric of each of the plurality of access controls and the latency metric of each of the plurality of access controls.

10 Claims, 5 Drawing Sheets

(51) Int. Cl.
*H04L 43/0852* (2022.01)
*H04L 45/121* (2022.01)
*H04L 45/12* (2022.01)
*H04W 40/08* (2009.01)
*H04W 40/22* (2009.01)
*H04W 40/24* (2009.01)

(52) U.S. Cl.
CPC .......... *H04L 45/121* (2013.01); *H04L 45/123* (2013.01); *H04L 45/124* (2013.01); *H04W 40/08* (2013.01); *H04W 40/22* (2013.01); *H04W 40/24* (2013.01)

(56) References Cited

U.S. PATENT DOCUMENTS

| | | |
|---|---|---|
| 7,315,548 B2 | 1/2008 | Joshi |
| 7,706,282 B2 | 4/2010 | Huang |
| 7,843,833 B2 | 11/2010 | Krishnakumar et al. |
| 7,924,758 B2 | 4/2011 | Park et al. |
| 7,975,069 B2 * | 7/2011 | Lee ........................ H04L 45/20 709/241 |
| 8,159,954 B2 | 4/2012 | Larsson et al. |
| 8,295,173 B2 | 10/2012 | Larsson et al. |
| 8,351,339 B2 | 1/2013 | Zhen et al. |
| 8,761,307 B1 | 6/2014 | Ionescu et al. |
| 8,811,188 B1 | 8/2014 | Bagchi et al. |
| 9,413,636 B2 | 8/2016 | Retana et al. |
| 9,531,635 B2 | 12/2016 | Vasseur et al. |
| 9,647,930 B2 | 5/2017 | Axnas et al. |
| 9,736,771 B2 | 8/2017 | Guo et al. |
| 9,893,981 B2 | 2/2018 | Guo et al. |
| 9,893,985 B2 | 2/2018 | Hui et al. |
| 2003/0033394 A1 | 2/2003 | Stine |
| 2005/0073962 A1 | 4/2005 | Zabele et al. |
| 2005/0111428 A1 * | 5/2005 | Orlik ..................... H04L 45/121 370/344 |
| 2006/0153081 A1 | 7/2006 | Simonsson et al. |
| 2014/0340196 A1 * | 11/2014 | Myers ................ G07C 9/00309 340/5.61 |
| 2015/0023369 A1 | 1/2015 | Hui et al. |
| 2016/0112300 A1 | 4/2016 | Kaiser et al. |
| 2017/0019830 A1 | 1/2017 | Lindoff et al. |
| 2017/0127222 A1 | 5/2017 | Lang et al. |

OTHER PUBLICATIONS

Written Opinion for International Application No. PCT/US2019/053077, International Filing Date Sep. 26, 2019, dated Nov. 26, 2019, 8 pages.

* cited by examiner

ENERGY-BALANCED AND LATENCY-CONSTRAINED ROUTING METHODS IN WIRELESS NETWORK

CROSS REFERENCE TO RELATED APPLICATIONS

This application is a National Stage application of PCT/US2019/053077, filed Sep. 26, 2019, which claims the benefit of U.S. Provisional Application No. 62/747,851, filed Oct. 19, 2018, both of which are incorporated by reference in their entirety herein.

BACKGROUND

The subject matter disclosed herein generally relates to the field of access control systems, and more particularly to an apparatus and method for communication between access controls of access control systems.

Access controls may be utilized to control access to specific entry point, such as, for example a lock on a door. Access controls may be wireless operating on an energy storage device (e.g., a battery) and energy within each access control is may be closely monitored.

BRIEF SUMMARY

According to one embodiment, a method of operating an access control system including a plurality of access controls is provided. The method including: determining an energy metric of each of the plurality of access controls; determining a latency metric of each of the plurality of access controls; transmitting the energy metric of each of the plurality of access controls; transmitting the latency metric of each of the plurality of access controls; collecting the energy metric and the latency metric at a head node or collecting energy metric at each of the plurality of access controls from a 1-hop transmission distance; and determining a data route through the plurality of access controls in response to the energy metric of each of the plurality of access controls and the latency metric of each of the plurality of access controls.

In addition to one or more of the features described above, or as an alternative, further embodiments may include that the energy metric includes at least one of a state of charge of a power supply of each of the plurality of access controls, an energy cost scheduled of each of the plurality of access controls, and the energy consumption required to transfer data via each of the plurality access control.

In addition to one or more of the features described above, or as an alternative, further embodiments may include that the latency metric includes at least one of access delays of each of the plurality of access controls and transmission delays of each of the plurality of access controls.

In addition to one or more of the features described above, or as an alternative, further embodiments may include that the latency metric and the energy metric are transmitted wirelessly via Bluetooth.

In addition to one or more of the features described above, or as an alternative, further embodiments may include that each of the plurality of access controls are door locks.

In addition to one or more of the features described above, or as an alternative, further embodiments may include that the power supply includes a battery system.

In addition to one or more of the features described above, or as an alternative, further embodiments may include that transmitting the energy metric of each of the plurality of access controls to each of the plurality of access controls further includes: propagating the energy metric amongst the plurality of access controls until the energy metric is received by the head node or transmitting the energy metric to each of the plurality of access controls using a 1-hop transmission distance.

In addition to one or more of the features described above, or as an alternative, further embodiments may include that transmitting the latency metric of each of the plurality of access controls to each of the plurality of access controls further includes: propagating the latency metric amongst the plurality of access controls until the latency metric is received by the head node or transmitting the latency metric to each of the plurality of access controls using a 1-hop transmission distance.

In addition to one or more of the features described above, or as an alternative, further embodiments may include that the head node is one of the plurality of access controls.

In addition to one or more of the features described above, or as an alternative, further embodiments may include that the data route is at least one of an energy-constrained route and a latency-constrained route.

According to another embodiment, a method of operating a first access control of an access control system including the first access control and one or more access controls is provided. The method including: determining an energy metric of a first access control of an access control system; determining a latency metric of the first access control; transmitting the energy metric to one or more access controls of the access control system; and transmitting the latency metric to one or more access controls, wherein the one or more access controls are configured to convey the energy metric and the latency metric to a head node configured to determine a data route through the access control system in response to at least the energy metric and the latency metric.

In addition to one or more of the features described above, or as an alternative, further embodiments may include that the one or more access controls propagate the energy metric and the latency metric amongst the one more or more access controls until the energy metric and the latency metric are received by the head node.

In addition to one or more of the features described above, or as an alternative, further embodiments may include that the energy metric includes at least one of a state of charge of a power supply of the first access control, an energy cost scheduled of the first access control, and the energy consumption required to transfer data via the first access control.

In addition to one or more of the features described above, or as an alternative, further embodiments may include that the latency metric includes at least one of access delays of the first access control and transmission delays of the first access control.

In addition to one or more of the features described above, or as an alternative; further embodiments may include that the latency metric and the energy metric are transmitted wirelessly via Bluetooth.

In addition to one or more of the features described above, or as an alternative, further embodiments may include that the first access control is a door lock.

In addition to one or more of the features described above, or as an alternative, further embodiments may include that the power supply includes a battery system.

In addition to one or more of the features described above, or as an alternative, further embodiments may include that the head node is one of the one or more access controls.

In addition to one or more of the features described above, or as an alternative, further embodiments may include that the data route is at least one of an energy-constrained route and a latency-constrained route.

According to another embodiment, a method of operating an access control system including a one or more access controls is provided. The method including: receiving, using a head node, a node status update from one or more access controls, the node status update including at least one of an energy metric and a latency metric; determining whether an end-to-end delay between the head node and each of the one or more access controls is acceptable; and transmitting a negative acknowledgment to each of the one or more access controls when the end-to-end delay between the head node and each of the one or more access controls is not acceptable.

Technical effects of embodiments of the present disclosure include determining energy metric and determining latency metric of access controls and utilizing the energy metric and the latency metric to determine a route for data amongst access controls of an access control system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 4:
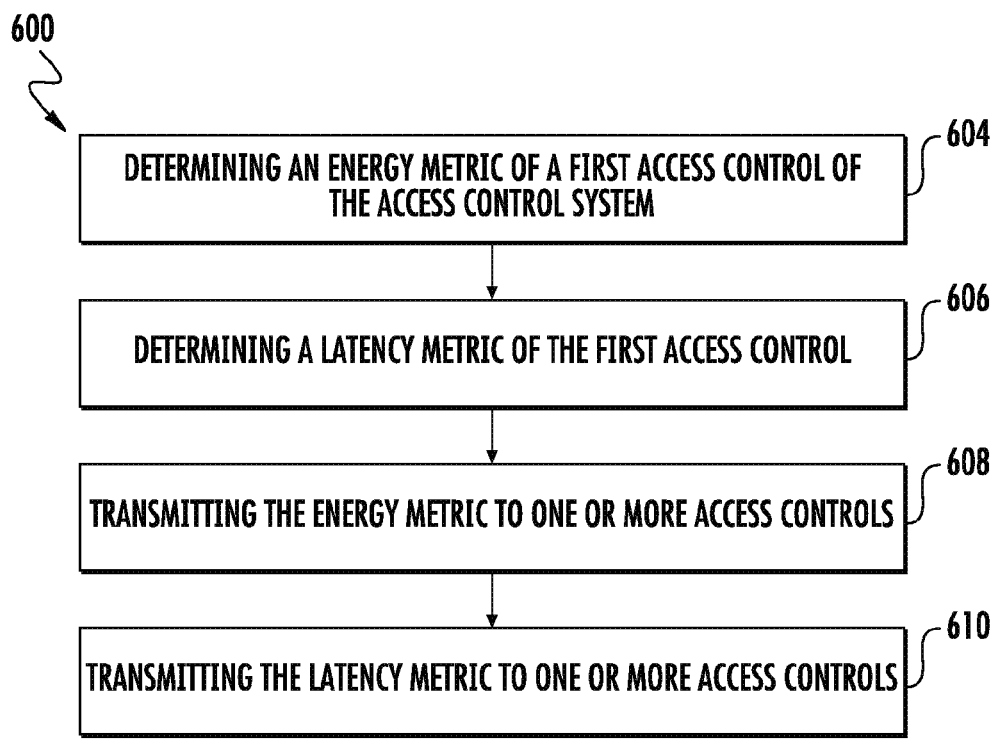
Figure 5:
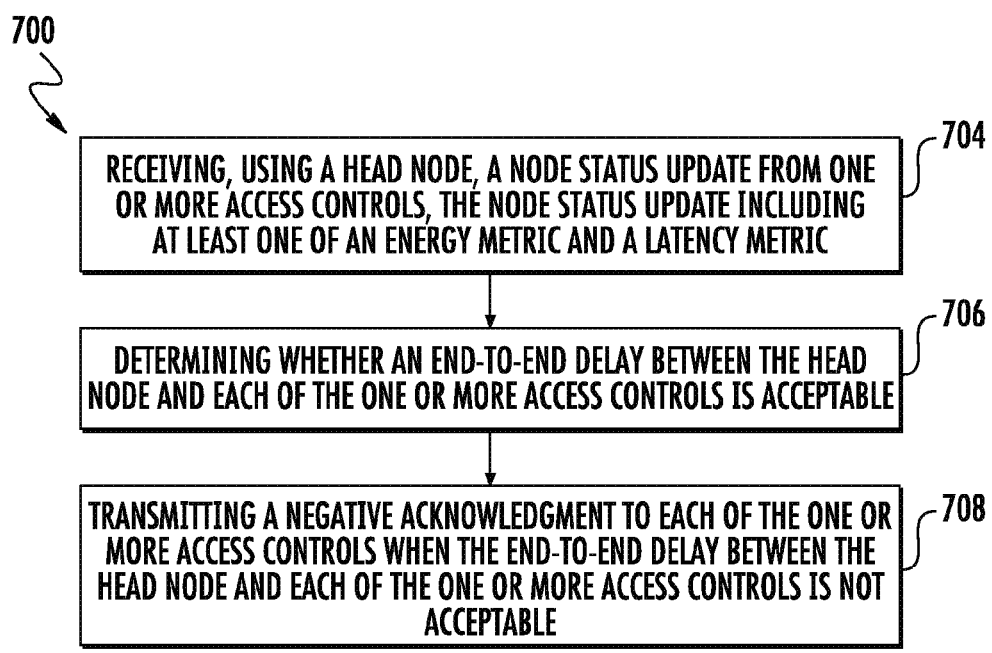

FIG. 4 is a flow diagram of a method of operating a first access control of an access control system comprising the first access control and one or more access controls, according to an embodiment of the present disclosure; and FIG. 5 is a flow diagram illustrating a method of operating an access control system comprising one or more access controls, according to an embodiment of the present disclosure.

DETAILED DESCRIPTION

A detailed description of one or more embodiments of the disclosed apparatus and method are presented herein by way of exemplification and not limitation with reference to the Figures.

Figure 1:
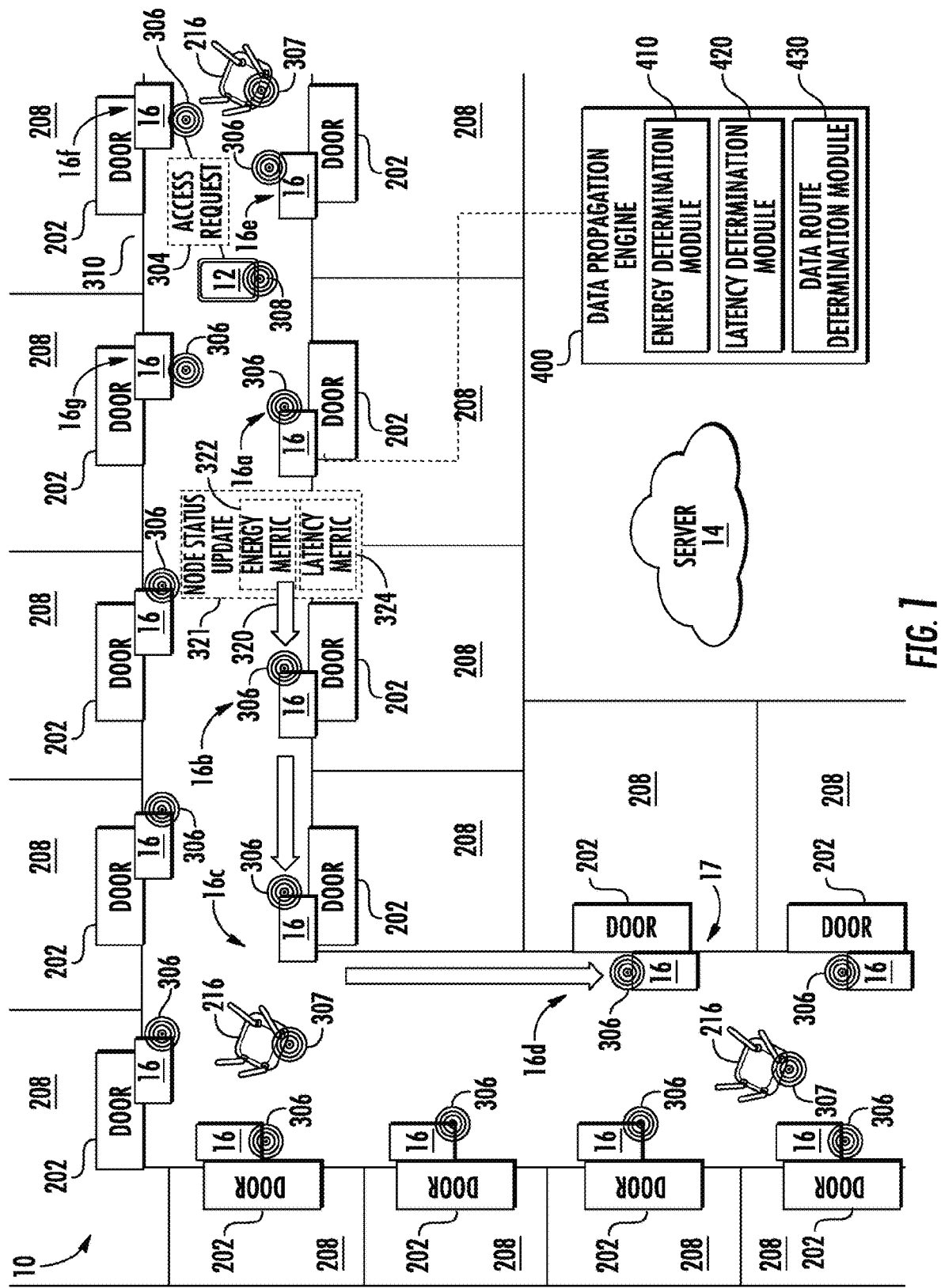
FIG. 1 illustrates a general schematic system diagram of an access control system, in accordance with an embodiment of the disclosure.

FIG. 1 schematically illustrates an access control system 10. The system 10 generally includes a mobile device 12, a server 14, a wireless access protocol device 216, and an access control 16. The access control system 10 may include any number of access controls 16. It should be appreciated that, although particular systems are separately defined in the schematic block diagrams, each or any of the systems may be otherwise combined or separated via hardware and/or software. In the illustrated embodiment, the access controls 16 may control access through a door 202 to a room 208. The access control system 10 may include any number of doors 202 and rooms 208. Further, there may be multiple doors 202 and access controls 16 for each room 208. It is understood that while the access control system 10 utilizes a door 202 and room 208 system for exemplary illustration, embodiments disclosed herein may be applied to other access control systems such as, for example, elevators, turnstiles, safes, etc.

A mobile device 12 or physical key card 92 (see FIG. 2) belonging to an individual may be granted access to one or more access controls 16 (e.g. the door lock on an office or hotel room assigned to the individual). In one example, when an individual begins working at a new building their mobile device 12 or physical key card 92 will be granted access to particular rooms 208 where they are allowed to enter and/or work. In another example, when an individual checks into the hotel room their mobile device 12 or physical key card 92 will be granted access to a room 208. There may be one or more mobile devices 12 or physical key cards 92 assigned to a room 208 (e.g. a husband and a wife in a hotel; or multiple workers in a collaborative workspace). An individual may utilize their mobile device 12 or physical key card 92 to unlock and/or lock the access control 16 operably connected to their assigned room 208 through an access request 304. The mobile device 12 or physical key card 92 may store credentials to unlock and/or lock the access control 16. Some credentials may be used for multiple access controls 16 if there are multiple access controls 16 for a single assigned room 208 or the individual is assigned access to multiple rooms 208. For example, an access control 16 operably connected to an individual's hotel room and an access control 16 operably connected to a hotel pool may respond to the same credential. Other credentials may be specific to a single access control 16.

Wireless communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication. For example, the selected range may be manually set by an individual as a chosen range or automatically set based on the limitations of hardware associated with the mobile device 12 and/or the access control 16.

Each access control 16 is a wireless-capable, restricted-access, or restricted-use device such as wireless locks, access control readers for building entry, and other restricted-use machines. The mobile device 12 submits credentials to the access controls 16, thereby selectively permitting a user to actuate (i.e., access or activate) functions of the access controls 16. A user may, for example, submit a credential to an electromechanical lock to unlock it, and thereby gain access to a room 208.

The mobile device 12 may transmit an access request 304 to the access control 16 by short-range radio transmission when the mobile device 12 is placed proximate the access control 16. The mobile device 12 is a wireless capable handheld device such as a smartphone that is operable to communicate with the server 14 and the access controls 16. The server 14 may provide data 320 including credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the access controls 16 receives credentials and other data. The access controls 16 may communicate with a lead node 17, through the wireless access protocol devices 216, or through the mobile device 12.

The access control 16 may be configured to continuously advertise a wireless signal 306 for positional data of the mobile device 12. The advertisement is the access control 16 declaring its presence to any nearby listening device and if it is a connectable advertisement it is an opportunity for another device (i.e., nearby mobile device 12) to connect to the access control 16. For example, the wireless signal 306 of the access control 16 may be a Bluetooth signal. The mobile device 12 is configured to detect the wireless signal 306 and determine positional data of the mobile device 12 in response to a signal strength of the wireless signal 306. The positional data of the mobile device 12 may help determine which access control 16 is located proximate the mobile device 12, and thus which access control 16 the mobile device 12 desires to enter Positional data of the mobile device 12 may also be determined using the wireless access protocol device 216. The wireless access protocol device 216 may be configured to advertise a wireless signal 307. The advertisement is the wireless access protocol device 216 declaring its presence to any nearby listening device and if it is a connectable advertisement it is an opportunity for another device (i.e., nearby mobile device 12) to connect to the wireless access protocol device 216. For example, the wireless signal 307 of the wireless access protocol device 216 may be a Wi-Fi signal. The mobile device 12 is configured to detect the wireless signal 307 and determine a positional data of the mobile device 12 in response to a signal strength of the wireless signal 307.

Positional data of the mobile device 12 may also be determined using the wireless access protocol device 216 and/or the access controls 16 to detect a wireless signal 308 advertised by the mobile device 12. The mobile device 12 may be configured to advertise a wireless signal 308. The advertisement is the mobile device 12 declaring its presence to any nearby listening device and if it is a connectable advertisement it is an opportunity for another device (i.e., access control 16 or wireless access protocol device 216) to detect this advertisement and triangulate the location of the mobile device 12. The wireless access protocol device 216 and/or the access controls 16 are configured to detect the wireless signal 308 and determine a positional data of the mobile device 12 in response to a signal strength of the wireless signal 308.

Wireless signal interaction data between the mobile device 12 and at least one of the access device 16 and the wireless access protocol device 216 may transmitted to the server 14 to determine positional data. The server 14 may use signal strength detected between the mobile device 12, access controls 16, and the wireless access protocol device 216 to determine positional data of the mobile device 12.

Figure 2:
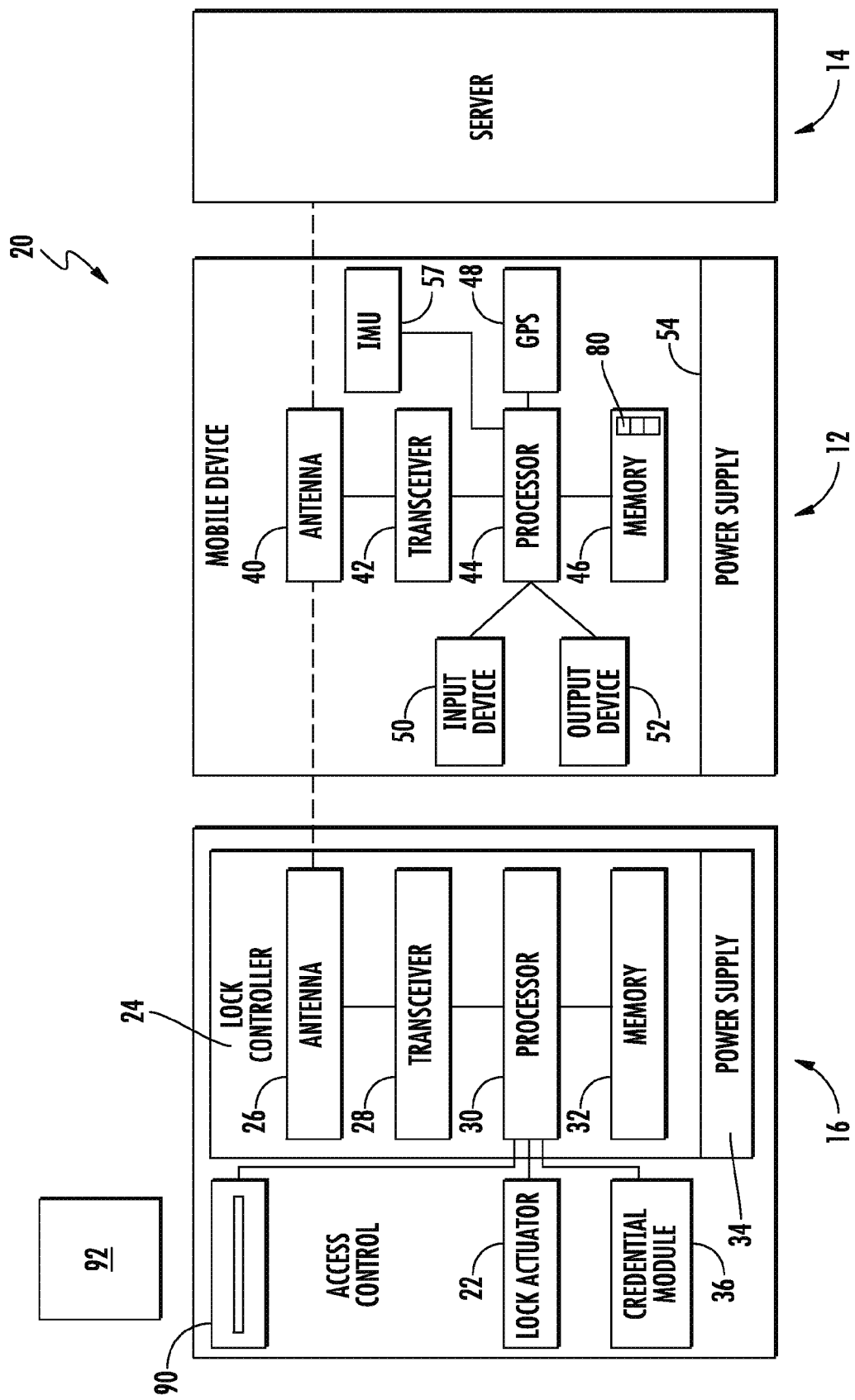
FIG. 2 illustrates a block diagram of an access control, mobile device and server of the access control system of FIG. 1, in accordance with an embodiment of the disclosure.

Referring now to FIGS. 1 and 2, the system 10 may include a data propagation engine 400 configured to propagate data amongst a group of access controls 16. The data may be propagated from one access control 16 to another. The data may be credentials of a specific user of a mobile device 12, control signal and periodical update data of access control 16, audit records, diagnostic data, access control 16 changes, firmware updates, peer to peer data exchanges between multiple access controls 16, etc. The data propagation engine 400 may be an algorithm or computer application stored on a memory 32 of the access control 16. The data propagation engine 400 may be comprised of modules including an energy determination module 410; a latency determination module 420; and a data route determination module 430. Each module 410, 420, 430 may be located in an access control 16. It should be appreciated that, although particular modules (e.g., 410, 420, 430) are separately defined in the schematic block diagrams, each or any of the modules may be otherwise combined or separated via hardware and/or software.

The energy determination module 410 is configured to detect an energy metric 322 of the access control 16. The energy metric 322 may include at least one of a state of charge of the power supply 34 of the access control 16, the energy cost scheduled, and the energy consumption required to transfer data 320. In an embodiment, the power supply 34 may be a battery system.

The state of charge is the remaining energy (e.g., electrical power) within the power supply 34. The energy cost scheduled, is the amount of electrical power within the power supply 34 that the access 16 has already scheduled. For example, the access control 16 may already have software updates scheduled to share or daily notifications. The server 14 may be configured to send control signals to the access controls 16 in a periodical or Ad hoc way. The energy power consumption required to transfer data 320 is the electric power required from the power supply 34 to transfer each type of data 320.

Each access control 16 is configured to share the energy metric 322 of the power supply 34 with neighboring access controls via a wireless signal 306. In an embodiment, the wireless signal is Bluetooth. For example, the energy metric 322 may be transmitted from a first access control 16*a* to second access control 16*b*, then from the second access control 16*b* to a third access control 16*c*, then from the third access control 16*c* to a fourth access control 16*b*, and so on and so forth to additional access controls. It is understood, that each access control 16 may share the energy metric 322 of the power supply 34 of the first access control 16*a* with multiple other access controls 16 and not just one access controls 16. For example, the first access control 16*a* may share the energy metric 322 to at least one of the second access control 16*b*, a fifth access control 16*e*, a sixth access control 16*f*, and a seventh access control 16*g*. The first access control 16*a* may share the energy metric 322 to any access control 16 within a selected range of the first access control 16. The selected range may be a hardware limit for the transmission of the wireless signal 306 of the first access control 16*a*.

The latency determination module 420 is configured to determine a latency metric 324 of the access control 16. The latency metric 324 may include at least one of access delays and transmission delays. The access delay depicts how long it may take an access control 16 to connect with another access control 16. The access delay may be specific to the wireless connection speeds between two specific access controls 16 or may be a general wireless connections speed of an access control 16. The access delay may be a function of advertisement parameters of the access control 16, scan parameters of the access control 16, and traffic conditions of the nearby access controls 16. The advertisement of the access control 16 is the projecting step in connecting to another access control. For example, the first access control 16*a* advertises a wireless single 306 hoping from another access control (e.g., the second access control 16*b*) to receive it and respond. The scan parameter is the receiving step in connecting to another access control. For example, the first access control 16a is scanning for advertisements of other access controls (e.g., the second access control). The traffic condition of nearby access controls 16 affects the access delay because of advertisement channel contention and busy state of receiving access control 16. For example, the advertisement channel contention occurs when the first access control 16a advertises a wireless signal 306 while the second access control 16b also advertises a wireless signal 306. Therefore, the access control 16c in scan mode will not successfully receive the wireless signal 306 from either the first access control 16a or the second access control 16b. The access delay caused by the busy state of the receiving access control (e.g., the third access control 16c) occurs when two access controls 16a and 16b are both in scan mode or data communication mode and no one will advertise a wireless signal 306 for the other access control to receive it and respond. The transmission delay depicts how long it may take an access control 16 to transmit data 320 to another access control 16. The transmission delay may be specific to the wireless transmission speeds between two specific access controls 16 or may be a general wireless transmission speed of an access control 16. In addition, the transmission delay is dependent on wireless link quality, and it is a function of data channel contention and interference. For example, two access controls 16 set up a connection and start their data transmissions using a specific channel. Meanwhile, there are ongoing data transmissions in other local access controls 16 using the same channel, leading to degraded transmission reliability and higher data packet delay. The number of intermediate hops between access control 16 and server 14 also has direct impacts on total transmission delay.

Each access control 16 may periodically transmit a node status update 321 that includes the energy metric 322 and the latency metric 324 to one or more surrounding access controls 16 and the one or more surrounding access controls will then propagate the node status update 321 to each access control 16 surrounding them until all access controls 16 of the access control system 10 receive the node update. During the node status update 321 transmission, only new updated data may be transmitted, thus reducing traffic in network. The node status update 321 that includes the energy metric 322 and the latency metric 324 may be limited to flood in a certain area or forwarded to server 14. For example, the access control 16 may only send node status update 321 to its one-hop access control neighbors. This is selected to achieve the balance between extra traffic overhead and energy-aware communication. The node status update is also possible to be forwarded to the server 14 because latency-constrained network communication is required, as explained further below.

The data route determination module 430 may utilize the node status update 321 transmitted to other access controls 16 and the node status update 321 received from other access controls to determine a data route to transmit data 320. The data route determination module 430 may determine an energy-constrained route and/or a latency-constrained route. One of the access controls 16 may act as a head node 17 and collect all of the node status updates 321 from the other access controls and determine an energy-constrained route and/or a latency-constrained route. The energy constrained route will prioritize conservation of energy, such that data 320 will be transferred between access controls 16 utilizing the least amount of energy or the route with the most balanced energy metric. The latency-constrained route will prioritize end-to-end packet delay, such that data 320 will be transferred between access controls 16 along the fastest route or a route that meets the end-to-end packet delay requirement.

The latency-constrained route is derived as followings. Each access control 16 periodically transmits a node status update 321 that includes the energy metric 322 and the latency metric 324 to one or more surrounding access controls 16. When the first access control 16a initially sets up a latency-constrained route to the head node 17, it uses the received node status updates 321 from neighboring access controls 16 and selects a next routing node (e.g., access control 16b) which is closer to the head node and its latency metric is the most appropriate (the shortest latency). This latency metric is included in a route request message, which is sent to the next routing node (e.g., access control 16b) by the access control 16a. Next, the access control 16b repeats the procedures above. Eventually, the route request message will reach the head node 17. The head node 17 then uses the collected latency metrics 324 from all of intermediate access controls 16 and determines if the end-to-end data delay between the access control 16a and head node 17 is acceptable or not. If the delay performance is not accepted, the head node 17 uses the same route to a send negative-acknowledgment (NACK) to the access control 16a. The NACK message may include recommended advertisement and scan parameters for new route request. The access control 16a then uses the recommended advertisement and scan parameters to start another new route request. The reason behind this method is the strong correlation between end-to-end data delay and configurations of advertisement and scan functions. In addition, access control 16 may actively monitor its energy and latency metrics. If the result is worse than a targeted threshold, the access control 16 may inform its neighboring access controls, initial route requesters, and head node 17 and a new route request may proceed again. As network evolves over time, head node 17 gathers more energy and latency metrics from the rest of access controls 16 in the network. That may be used to help the head node 17 find more energy-efficient or latency-efficient routes for some access controls 16.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90, and a credential module 36.

The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuate the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or MD chip. The card data may include credentials to grant access to a specific access control 16. For example, for a period the mobile device 12 may be granted access to a specific access control 16, such as, for example, a period of stay/employment for the individual possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately. In an embodiment, the access control 16 is composed of separate components—a reader (e.g., transceiver 28 and/or antenna 26) at a door 202, a processor 30 that gets the credential from the reader, and then a lock actuator 22 that gets a signal from the processor 30 to actuate an electromechanical lock.

The lock transceiver 28 is capable of transmitting and receiving data to and from at least one of the mobile device 12, the wireless access protocol device 216, and the other access controls 16. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and an inertial measurement unit (IMU) sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The IMU sensor 57 may be a sensor such as, for example, an accelerometer, a gyroscope, or a similar sensor known to one of skill in the art.

Figure 3:
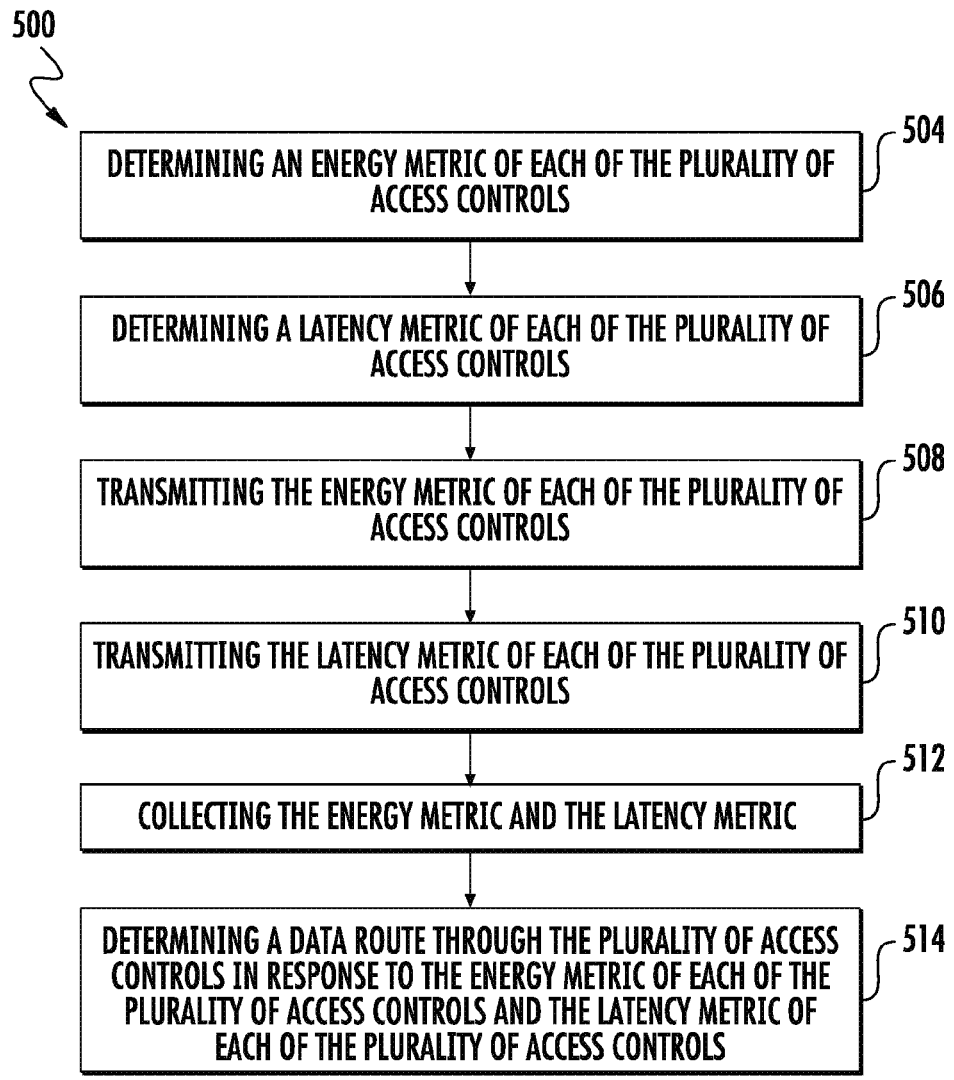
FIG. 3 is a flow diagram illustrating a method of operating an access control system comprising a plurality of access controls, according to an embodiment of the present disclosure.

Referring now to FIG. 3 with continued reference to FIGS. 1-2. FIG. 3 shows a flow chart of a method 500 of operating an access control system 10 comprising a plurality of access controls 16. In an embodiment, each of the plurality of access controls 16 are door locks. At block 504, an energy metric 322 of each of the plurality of access controls 16 is determined. As stated above, the energy metric 322 may include at least one of a state of charge of a power supply 34 of each of the plurality of access controls 16, an energy cost scheduled of each of the plurality of access controls 16, and the energy consumption required to transfer data via each of the plurality access control 16.

At block 506, latency metric 324 of each of the plurality of access controls 16 is determined. As stated above, the latency metric 324 includes at least one of access delays of each of the plurality of access controls 16 and transmission delays of each of the plurality of access controls 16.

At block 508, the energy metric 322 of each of the plurality of access controls 16 is transmitted to each of the plurality of access controls 16. In an embodiment, the energy metric 322 of each of the plurality of access controls 16 is transmitted. The energy metric 322 may be transmitted by propagating the energy metric 322 amongst the plurality of access controls 16 until the energy metric 322 is received by the head node 17. At block 510, the latency metric 324 of each of the plurality of access controls 16 is transmitted to each of the plurality of access controls 16. In an embodiment, the latency metric 324 of each of the plurality of access controls 16 may be transmitted by propagating the latency metric 324 amongst the plurality of access controls 16 until the latency metric 324 is received by the head node 17. In an embodiment, the latency metric 324 and the energy metric 322 may be transmitted wirelessly via Bluetooth. In another embodiment, the head node 17 is one of the plurality of access controls 16. At block 512, the energy metric 322 and the latency metric 324 may be collected at a head node 17 or at each of the plurality of access controls from a 1-hop transmission distance. The 1-hop transmission distance may mean that the data (e.g., the energy metric) only transfers between a first access control 16a and a second access control 16b.

At block 514, a data route through the plurality of access controls 16 is determined in response to the energy metric 322 of each of the plurality of access controls 16 and the latency metric 324 of each of the plurality of access controls 16. In an embodiment, the data route is at least one of an energy-constrained route and a latency-constrained route. The data route may depict which route the data 320 should take amongst the plurality of access controls 16 (i.e., which access controls should transfer and receive the date 320). Block 514 may be performed by either the head node 17 or any access control 16.

While the above description has described the flow process of FIG. 3 in a particular order, it should be appreciated that unless otherwise specifically required in the attached claims that the ordering of the steps may be varied.

Referring now to FIG. 4 with continued reference to FIGS. 1-2. FIG. 4 shows a flow chart of a method 600 of operating a first access control 16 of an access control system 10 comprising the first access control 16a and one or more access controls 16. In an embodiment, each of the one or more access controls 16 are door locks. In another embodiment, a first access control 16a is a door lock.

At block 604, an energy metric 322 of a first access control 16a of the access control system 10 is determined. In an embodiment, the energy metric 322 includes at least one of a state of charge of a power supply 34 of the first access control 16a, an energy cost scheduled of the first access control 16a, and the energy consumption required to transfer data 320 via the first access control 16a. At block 606, a latency metric 324 of the first access control 16 is determined. In an embodiment, the latency metric 324 includes at least one of access delays of the first access control 16a and transmission delays of the first access control 16a.

At block 608 the energy metric 322 is transmitted to one or more access controls 16. At block 610, the latency metric 322 is transmitted to one or more access controls 16. In an embodiment, the latency metric 324 and the energy metric 322 may be transmitted wirelessly via Bluetooth. The one or more access controls 16 are configured to convey the energy metric 322 and the latency metric 324 to a head node 17 configured to determine a data route through the access control system 10 in response to at least the energy metric 322 and the latency metric 324. In an embodiment, the head node 17 is one of the one or more access controls. In another embodiment, the head node 17 is a software system that is managing the network of locks (i.e., access controls 16).

In an embodiment, the one or more access controls 16 propagate the energy metric 322 and the latency metric 324 amongst the one more or more access controls 16 until the energy metric 322 and the latency metric 324 are received by the head node 17. In an embodiment, the data route is at least one of an energy-constrained route and a latency-constrained route. In another embodiment, the one or more access controls 16 propagate the energy metric 322 and/or the latency metric 324 to their 1-hop neighbors. Then the energy-aware data route toward the head node 17 is established. The access control system 10 may operate following a policy so that each node (i.e., access control 16) knows when to pick either the fastest route (i.e., latency-constrained route) or the route with the most energy (i.e., energy-constrained route) for a particular message (i.e., data 320). Some messages (i.e., data 320) need to 'get there fast' such as an alert or alarm, while other messages (i.e., data 320) can be sent on an energy efficient route so they do not use up as much power for the access control system 10.

In an embodiment, the hop-by-hop data route selection is performed and this data route is confirmed by head node 17 for latency or energy performance. In another embodiment, the hop-by-hop route selection is performed for energy-aware routing and is not evaluated by head node because of the control message overhead.

While the above description has described the flow process of FIG. 4 in a particular order, it should be appreciated that unless otherwise specifically required in the attached claims that the ordering of the steps may be varied.

Referring now to FIG. 5 with continued reference to FIGS. 1-2. FIG. 5 shows a flow chart of a method 700 of operating an access control system 10 comprising one or more access controls 16. A block 704, a head node 17 may receive a node status update 321 from one or more access controls 16. The node status update 321 may include at least one of an energy metric 322 and a latency metric 324. At block 706, it is determined whether an end-to-end delay between the head node 17 and each of the one or more access controls 16 is acceptable. At block 708, a negative acknowledgment (NACK) is transmitted to each of the one or more access controls 16 when the end-to-end delay between the head node 17 and each of the one or more access controls is not acceptable. As mentioned above, the NACK message may include recommended advertisement and scan parameters for new route request. The access control 16a then uses the recommended advertisement and scan parameters to start another new route request.

The above description has described the flow process of FIG. 5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating an access control system comprising a plurality of access controls, the method comprising:

determining an energy metric of each of the plurality of access controls at each of the plurality of access controls;
determining a latency metric of each of the plurality of access controls at each of the plurality of access controls;
transmitting the energy metric of each of the plurality of access controls from each of the plurality of access controls;
transmitting the latency metric of each of the plurality of access controls from each of the plurality of access controls;
collecting the energy metric and the latency metric at a head node or collecting energy metric at each of the plurality of access controls from a 1-hop transmission distance; and
determining a data route through the plurality of access controls in response to the energy metric of each of the plurality of access controls and the latency metric of each of the plurality of access controls.

2. The method of claim 1, wherein the energy metric includes at least one of a state of charge of a power supply of each of the plurality of access controls, an energy cost scheduled of each of the plurality of access controls, and the energy consumption required to transfer data via each of the plurality of access controls.

3. The method of claim 1, wherein the latency metric includes at least one of access delays of each of the plurality of access controls and transmission delays of each of the plurality of access controls.

4. The method of claim 1, wherein the latency metric and the energy metric are transmitted wirelessly via Bluetooth.

5. The method of claim 1, wherein each of the plurality of access controls are door locks.

6. The method of claim 2, wherein the power supply includes a battery system.

7. The method of claim 1, wherein transmitting the energy metric of each of the plurality of access controls to each of the plurality of access controls further comprises:
propagating the energy metric amongst the plurality of access controls until the energy metric is received by the head node or transmitting the energy metric to each of the plurality of access controls using a 1-hop transmission distance.

8. The method of claim 1, wherein transmitting the latency metric of each of the plurality of access controls to each of the plurality of access controls further comprises:
propagating the latency metric amongst the plurality of access controls until the latency metric is received by the head node or transmitting the latency metric to each of the plurality of access controls using a 1-hop transmission distance.

9. The method of claim 1, wherein the head node is one of the plurality of access controls.

10. The method of claim 1, wherein the data route is at least one of an energy-constrained route and a latency-constrained route.

* * * * *